UNITED STATES PATENT OFFICE.

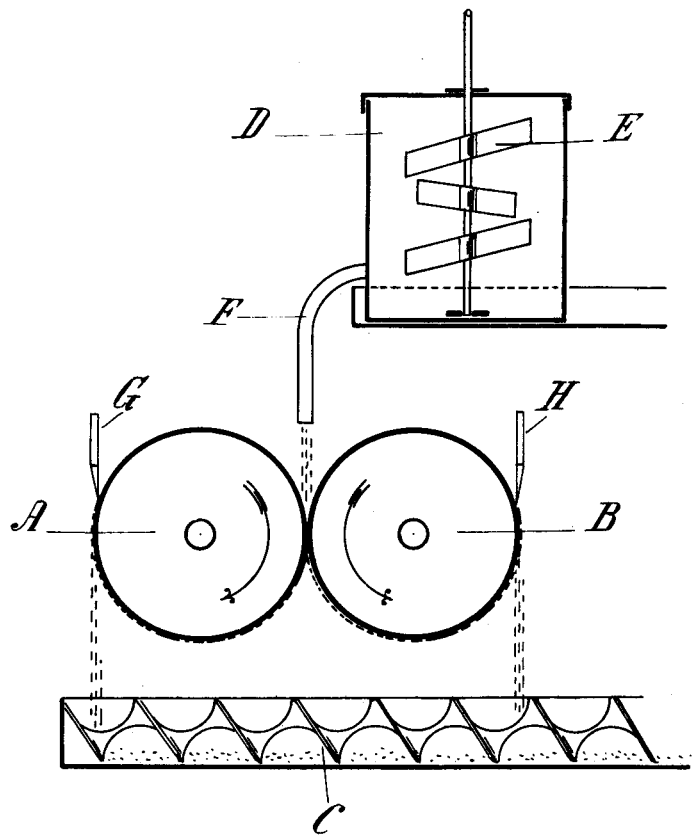

JULIUS KANTOROWICZ, OF BRESLAU, GERMANY.

PROCESS OF MANUFACTURING ADHESIVES GIVING WITH COLD WATER STRONG CEMENTING MASSES.

1,105,567. Specification of Letters Patent. Patented July 28, 1914.

Application filed August 17, 1909. Serial No. 513,338.

*To all whom it may concern:*

Be it known that I, JULIUS KANTOROWICZ, a subject of the King of Prussia, German Emperor, residing at 28 Goethestrasse, in the city of Breslau, Kingdom of Prussia, German Empire, have invented new and useful Improvements in Processes of Manufacturing Adhesives Giving with Cold Water Strong Cementing Masses, of which the following is a specification.

My invention relates to the production of adhesive matter from substances containing starch, which adhesive matter gives when mixed with cold water a very strong adhesive.

According to my invention the substance containing starch, is stirred with water to which chemicals which will increase its adhesive properties or convert the starch into dextrin, or soluble starch have been added so as to form a thin pulp which is heated in thin layers to a temperature above 100 degrees centigrade on a highly heated surface.

The drying is effected on heated surfaces in layers which are as thin as possible. The temperature of dessication must be such that it will be sufficient to effect a conversion into starch-paste and expel the water, but not so high as to burn the starch. The product obtained in accordance with the aforesaid process, when stirred with cold water, forms a very strong adhesive.

A mechanism suitable for carrying out the present invention is illustrated in the accompanying drawing in a vertical section.

D is a tank, containing an agitator F, for mixing starch, water and the chemicals. The mixture is led through the pipe C to the rollers A and B which rotate in the direction of the arrows.

E and G are knives which remove the dried starch from the rollers A and B. The starch comes to the carrier H for instance an endless band.

One has already mixed starch with water and has dried the mixture. In this way, however, one cannot obtain a product of sufficiently strong adhesive power. The present process gives very strong adhesive by effecting the drying operation at temperatures above 100 degrees centigrade in a thin layer and adding before the drying operation the said chemicals.

The chemicals employed for the purposes of my invention to increase the adhesive power of starch are substances of alkaline or acid reaction such, for instance, the alkaline substances as caustic alkalis, or sodium carbonate, which substances increase the cementing power of starch paste or acid substances as bisulfates, acids which effect the conversion of starch into dextrin, alkaline peroxids, such as sodium peroxid, barium peroxid, or peroxids in presence of acids, such as manganese peroxid, and the like. Or I may use substances evolving ozone, or chlorin, such as calcium hypochlorite in the presence of acids. Hygroscopic compounds, such as magnesium sulfate and calcium chlorid, may also be employed.

The starch may be used as such, or in the form of materials containing starch, such as flour from bulbs, or roots, or from cereals, or the like. It is of special advantage that in the process, the substance containing starch can be converted into adhesive masses without the starch being isolated. When wheaten flour is employed the gluten contained in the finished product enhances the adhesive properties of the product.

The materials containing starch can, if the starch which they contain does not otherwise readily form a paste with water, be unhusked, or peeled, and comminuted. For instance, potatoes may be employed in a triturated state.

Although the selection of the chemicals to be used depends on the desired binding power of the masses to be obtained, it is preferred to use chemicals having an alkaline, or an acid, reaction.

The products of this invention can be used as ordinary adhesives, or as size, or as thickening for dyes used in printing on fabrics, or as dressing materials for yarns and stuffs, or for any other purpose to which they may be applicable.

Example I: 100 kilograms of potatoes are finely triturated and mixed with ½ kilogram of hydrochloric acid of 1.2 specific gravity and 300 liters of water. The mixture is heated in thin layers by passing it over rolls heated to 110 degrees centigrade, the conversion into adhesive material and drying being thus effected simultaneously. The mixture of starch and water and hydrochloric acid may first be heated to a temperature of 75° centigrade so as to effect the conversion into adhesive material and the mass formed be passed in the form of thin layers over rolls heated to 110 degrees centigrade. The flaky mass obtained can be ground, if one desires a product which swells rapidly when mixed with cold water.

Example II: 100 kilograms of wheaten flour are stirred to a pulp with 500 liters of water mixed with 2 kilograms of pulverized sodium carbonate and dried in thin layers on rolls heated to 120 degrees centigrades. The flaky mass obtained is coarsely ground.

Example III: 100 kilograms of potatoes are finely ground and mixed with ¼ of a kilogram of liquid ammonia of 1.2 specific gravity. The mixture is passed, in thin sheets, over rolls heated to 110° centigrade, thereby causing it to be simultaneously dried and converted into adhesive material. The product may be ground.

The quantity of chemicals needed is very small, the quantity in each case being determined by ascertaining the smallest amount which will produce a good adhesive when the flakes are mixed with water. The adhesive power can be increased by the addition of a larger amount of chemicals, but this is not often desirable.

What I claim is:

1. The process of manufacturing substances which will form with cold water strong adhesives, the said process consisting in mixing starch containing substances in comminuted state with cold water in sufficient amount to obtain a liquid mixture, adding a chemical improving the adhesiveness of starch and subjecting the said mixture in thin layers to a temperature of over 100 degrees centigrade sufficient for converting the starch into paste and driving the water out of the said paste.

2. The process of manufacturing substances which will form with cold water strong adhesives, the said process consisting in mixing starch containing substances in comminuted state with cold water in sufficient amount to obtain a liquid mixture, adding a chemical of alkaline reaction and subjecting the said mixture in thin layers to a temperature of over 100 degrees centigrade sufficient for converting the starch into paste and driving the water out of the said paste.

In testimony whereof I affix my signature in presence of two witnesses.

JULIUS KANTOROWICZ.

Witnesses:
 ERNST KATZ,
 ERNST BLEISCH.